Nov. 26, 1946.　　　　　H. EGLI　　　　2,411,681
PROCESS AND APPARATUS FOR PASTEURIZING MILK
Filed Feb. 19, 1941
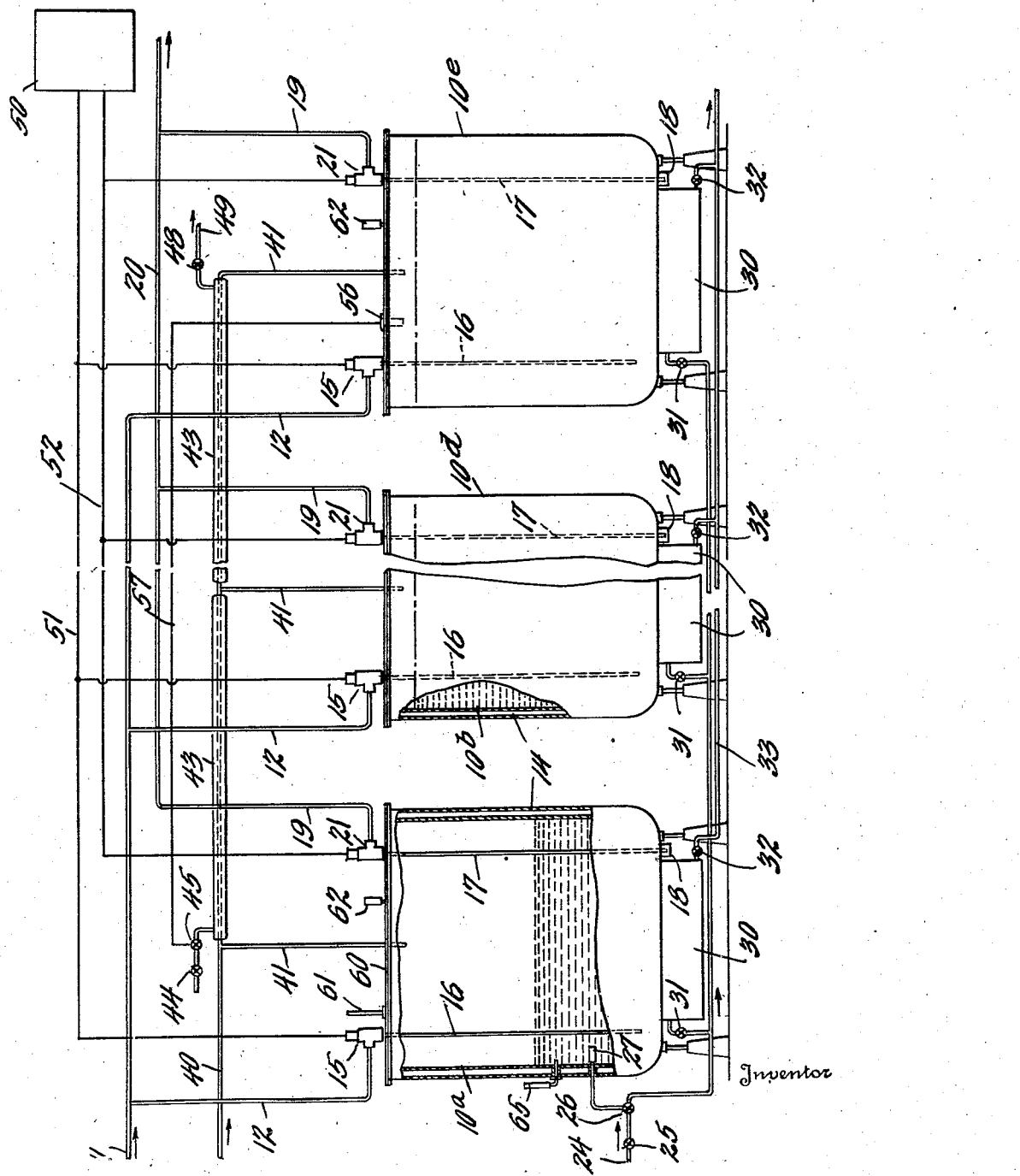
Inventor
By Huldreich Egli,
Henry H. Snelling Attorney Patented Nov. 26, 1946

2,411,681

UNITED STATES PATENT OFFICE 2,411,681

PROCESS AND APPARATUS FOR PASTEURIZING MILK

Huldreich Egli, Baltimore, Md.

Application February 19, 1941, Serial No. 379,731

10 Claims. (Cl. 99—211)

This invention relates to a method and an apparatus for handling and storing of fluids and has for its principal object the provision of means to handle and store, with a minimum amount of foaming and shrinkage, a liquid composed of a plurality of ingredients, such for example as milk.

An important object of the present invention is the provision of a system for pasteurizing milk in an efficient manner and under conditions which minimize the presence of bacteria in the finished product. While for convenience of illustration and description of the process, the apparatus will be described in connection with a system for pasteurizing milk, it should be obvious that the invention is not thus limited and that the method may be used in connection with any fluid whether of a single ingredient or a mixture of ingredients, for example, the process is suitable for a fluid either gaseous or liquid, i. e., beer, milk, or any of the various beverages on the market.

A still further object of the present invention consists of a method of storing fluids, the lower fluid being at one temperature and the upper fluid being at a different temperature. A still further object lies in the provision of a system of holding milk during the pasteurizing process in a plurality of containers each cross-connected to the others so that the pressure on each batch is identical.

Still further minor objects of the invention will be apparent from the following description and as set forth in the claims.

The drawing illustrates a system primarily intended for the pasteurizing of milk.

The apparatus illustrated in the figure consists of a plurality of containers 10a to 10e each receiving hot milk from a main line 11 feeding to branches 12 leading to each of the several vats or tanks which are of well known type and may be jacketed or insulated as indicated at 14 in connection with container 10b. The advantage of a plurality of containers lies in the provision of continuous flow, one container is filled as another is emptied. The several branch lines 12 each lead to a valve 15 electrically controlled to discharge the hot milk through a pipe 16 to a point close to the bottom of the tank 10. A similar pipe 17 leading from a well 18 discharges the milk through branch lines 19 to the exit header 20 when permitted by the electrically controlled exit valve 21. It might be noted here that while the valves 15 and 21 may be mechanically operated or may be electrically controlled in any manner it is my preference that these valves shall be operated by time alone.

The particular apparatus for warming the milk is somewhat immaterial, steam, electric connections, or hot water being suitable agents. My preference is largely in favor of hot water because of its easy control. The hot water enters at 24, past a stop valve 25 and a control valve 26, the latter being governed by a thermostat 27 set in the vat or container at a convenient height preferably nearer the bottom than the top. Under each container there is a suitable heating device indicated generally by the numeral 30 which in the case of hot water would be a simple jacket having an entry valve 31 and an exit valve 32 leading to the return conduit 33 which leads to the heater, not shown, which delivers the water to the pipe 24. By placing the heater under the tank the rising of the warmer particles by change of density with increased temperature takes the place of an otherwise necessary agitating means.

It is desired to have the temperature of the fluid above the liquid at all times greater than that of the lower fluid, the pressure of the fluid above the liquid being greater than atmospheric. To this end the pipe 40 supplies heated and filtered air to each of the tanks through the vertical feeder pipes 41. Jackets 43 surround the pipe 40 as shown and might use electrical resistance wires or steam or hot water, preferably a liquid controlled by a stop valve 44 and an electrical control valve 45 which admits the heating fluid at such a rate as to keep the air at the chosen temperature, for example, at 150° F. at the tops of the containers, the pressure varying in accordance with the hydrostatic pressure on the milk or other liquid, for example, it might be five pounds corresponding to a lift of over ten feet. The hot water, if used, might be as high as 180° F., the amount being controlled by the valve 45 and by the valve 48, which latter however need only be a stop valve for emergency use being located in the return line 49 which discharges back to the heater, not shown, which supplies the pipe 42.

The electric panel 50 controls the various mechanisms and its specific construction forms no part of the present invention. The panel is connected by the cable 51 with each inlet valve and is connected by the cable 52 with each of the exit valves. The thermostat 56 extending into the air space above the liquid in the last container 10e actuates mechanically or electrically, preferably the latter, the heat supply control valve 45 through the wire 57 which may, but need not, be connected to the panel 50.

The shrinkage of the liquid which is thought to be inseparable from the process of pasteurizing is practically eliminated in my process by preventing air from taking moisture from the milk. This is accomplished by using the same air over and over again during an indefinite number of cycles of filling, holding, and emptying. As the air is displaced from one container, as 10a, the same air at constant temperature and pressure is entering another container, as 10e, without need for appreciable make-up air from outside. Hence this air after first being saturated with water vapor is incapable of taking up further moisture and, corresponding to its pressure, counteracts the vapor pressure of the liquid and consequently avoids shrinkage.

In my process foaming is minimized by increasing the surface tension so as to prevent the gathering of the active colloids to spread in films sufficiently tough and elastic as to keep the globules of gas from coalescing. In froth or foam an enormous area of gas surface is produced as the gas phase is dispersed as minute bubbles in the liquid phase. The gas bubbles persist for some time owing to the presence of milk colloids in a solid condition. Foaming tends to convey bacteria, is wasteful, and tends to hinder efficient handling of the milk or the fluid being treated. As stated in Department of Agriculture Circular 108, March 1930, foaming in pasteurizers may present a public health problem hence its avoidance is of paramount importance. By having relatively deep containers with increased pressure above the liquid therein, the gap or differential between the boiling point of the water at the bottom of the tank and that of the water near the top of the tank is reduced so a greater surface tension of the liquid is obtained and with it a substantial absence of foaming and a material reduction of skin formation. A simple experiment will show that when a foaming liquid is discharged into a container held at a positive or above atmosphere pressure an appreciable amount of the foaming at once collapses with coalescence of the occluded gas bubbles.

The temperature control is essential in the pasteurizing process; also in holding processes of beverages consisting of mixed ingredients. At times it is desirable to maintain a slightly higher temperature at the exposed surface to air pressure of the contents than that of the contents itself. For this reason the pressure equalizing conduit, which is cross connected with all containers, is independently controlled as to temperatures governed by the thermostat inserted into the air space above the liquid line in the containers.

Further details of the invention can best be understood through a description of the operation of the mechanism when the process comprises the pasteurizing of milk. In the drawing the three center containers are each full and are being held at chosen temperature and pressure both for the milk at the bottom and for the air above. The final container 10e is being emptied and the first container 10a is being filled, the milk at a temperature of say 145° F. entering through pipe 11, branch line 12, past electrically controlled entry valve 15 and tank pipe 16 which is secured to the removable cover 60 which carries a thermometer 61 and a relief valve 62 as well as the entry and exit valves.

This milk is under pressure which might be added by a pump but preferably the pressure is above atmospheric but of course is lower than the pressure head on the milk. However, as air is discharged through pipe 41 to the heated header 40 in the first tank it is entering the final tank 10e at precisely the same rate and the same temperature and pressure. The valve 62 on each container insures that the temperature of the air or other fluid at the top of the container shall remain constant. The thermostatically operated valve opens at a chosen temperature, say 148° F. and lets out the air which at this temperature is colder than desired and by lowering the pressure causes air to enter from the heated air line 40 which itself is kept at a constant pressure by the ordinary mechanism and its temperature is maintained by the automatic valve 45 controlled by thermostat 56 in the removable top of container 10e. As is quite obvious, the valve 62 will open upon a rise of temperature when the system is used for chilling the liquid as in that case the temperature of the upper fluid will be lower than that of the liquid beneath, and the heater 30 will be a refrigerating device.

As milk rises in the tank 10a it receives heat from the heater in contact with only a portion of the bottom of the container. The thermometer 65 indicates the temperature and the adjacent thermostat operated by the temperature opens or closes the valve 26, thus insuring precisely the correct temperature in the containers at all times.

Assuming the chosen temperature for pasteurizing is 145° and the cycle is one hour, the thermostat 27 will operate to close the valve 26 at a temperature of 146°, thus insuring the temperature of the milk. The temperature of the air is greater and this is controlled by the valve 62 as noted. With the arrangement illustrated it would take 12 minutes to empty or to fill any one of the tanks, these two operations always being simultaneous in the series. Any one tank or container which began filling at the even hour starts to empty 36 minutes after it has been filled, i. e., at 48 minutes after the hour, thus completing the hour when it is fully empty. While I find it best to have a separate temperature control of the compressed air above the liquid in the holding containers, there seems to be no need for an independent control of the temperature in the various heaters 30, nor is there need for individual control of the heat in the several jackets 43 as the pressure in the pipes 40 and 41 is automatically maintained by the pressure equalizing features described. As previously suggested the same equipment, with somewhat different connections, also serves at other times to chill the milk, the mains 43 and 24 now carrying a refrigerant.

What I claim is:

1. The process of minimizing frothing in charging a liquid into containers which consists in providing two containers with the liquid beneath a fluid at a pressure above atmospheric, cross-connecting the fluids to equalize their pressure, and introducing further liquid under pressure into one container as liquid at the same rate is withdrawn from the other container.

2. The process of claim 1 in which the temperature of the fluid is maintained at a predetermined degree in each container, and the further liquid is introduced at a substantially constant pressure.

3. The process of claim 1 in which the fluid is compressed air, the temperature of which is maintained at the same degree, in each container, and the further liquid is introduced at a substantially constant pressure.

4. A constant pressure liquid holding system comprising a plurality of closed containers, an air conduit, means for holding air in said conduit at a chosen pressure and temperature, means connecting the conduit with each of the containers, a relief valve on each container discharging air from the container when its temperature departs from a chosen value whereby air at the chosen pressure and temperature will flow into the container from the air conduit.

5. The device of claim 4 with means for charging a liquid under pressure to any one of the containers, and means for discharging another of said containers at the same rate as the first container is charged.

6. In combination a jacketed container, means for maintaining a fluid under pressure in the container, a container relief valve, opening to discharge the fluid if the temperature of the fluid falls below a chosen amount, means for charging and discharging a liquid into the container below said fluid, including piping partly within the container and time operated valves in the charging and discharging piping.

7. The process of claim 1 in which the fluid is compressed air saturated with water vapor, the liquid is milk, and the air driven from one container by the incoming milk is discharged into said other container which is simultaneously being emptied, whereby the water vapor saturated air is reused.

8. In combination, a series of closed containers, each having a bottom, heating means below each container and having horizontal dimensions less than those of the bottom, a liquid distributing system leading to each container, including an entry pipe and an exit pipe in each container, having their bottom open ends near the bottom of the container, time controlled valves governing the flow through the entrance pipes and the exit pipes, an air pipe having an open end near the top of each container and within the same, an air conduit joining all of said air pipes, means for heating the air in the conduit controlled by the temperature adjacent the open end of one of the air pipes, means for maintaining a pressure above atmospheric in the conduit and the air pipes, and means for charging liquid through the distributing system and simultaneously forcing air through the closed path of the conduit and air pipes, whereby shrinkage of the liquid is minimized and the paths taken by the fluid and the liquid are widely separated, the air entering and leaving the containers at the top only and the liquid entering and leaving the containers at the bottom only.

9. The device of claim 8 in which the heating means below the containers is controlled by the temperature within the container separately of the heating means for the air conduit, and a relief valve on one of the containers discharges air from above the liquid should such air fall below a predetermined degree of temperature.

10. In a milk pasteurizing system, a jacketed container, means for admitting heated air under pressure to the container above the milk, means for releasing air from the container as it falls below a predetermined degree of temperature, and time controlled means for admitting milk to the container and for discharging milk therefrom, said last means including piping, the open ends of which are widely spaced from the open ends of the air admitting and releasing means, whereby to avoid passage of milk through any part of the air system.

HULDREICH EGLI.